US007536589B2

(12) United States Patent
Ide

(10) Patent No.: US 7,536,589 B2
(45) Date of Patent: May 19, 2009

(54) PROCESSING APPARATUS

(75) Inventor: Nobuhiro Ide, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 523 days.

(21) Appl. No.: 11/355,885

(22) Filed: Feb. 17, 2006

(65) Prior Publication Data

US 2006/0190759 A1 Aug. 24, 2006

(30) Foreign Application Priority Data

Feb. 21, 2005 (JP) ............................. 2005-044258

(51) Int. Cl.
*G06F 11/00* (2006.01)
(52) U.S. Cl. ..................... 714/10; 714/11; 714/13
(58) Field of Classification Search .............. 714/10, 714/11, 13
See application file for complete search history.

(56) References Cited

U.S. PATENT DOCUMENTS

| 5,325,517 | A | * | 6/1994 | Baker et al. ................ 714/11 |
| 5,590,365 | A | | 12/1996 | Ide et al. |
| 5,895,498 | A | | 4/1999 | Ueno et al. |
| 5,923,830 | A | * | 7/1999 | Fuchs et al. ................ 714/11 |
| 6,038,684 | A | * | 3/2000 | Liddell et al. .............. 714/11 |
| 6,141,770 | A | * | 10/2000 | Fuchs et al. ................ 714/11 |
| 6,263,452 | B1 | * | 7/2001 | Jewett et al. ................. 714/9 |
| 6,363,476 | B1 | | 3/2002 | Ide |
| 6,772,368 | B2 | * | 8/2004 | Dhong et al. ................ 714/11 |
| 6,785,841 | B2 | * | 8/2004 | Akrout et al. ............... 714/11 |
| 6,832,298 | B2 | * | 12/2004 | Fujii et al. ................. 711/147 |
| 7,047,440 | B1 | * | 5/2006 | Freydel et al. .............. 714/11 |
| 7,117,389 | B2 | * | 10/2006 | Luick ......................... 714/11 |
| 7,343,515 | B1 | * | 3/2008 | Gilbertson et al. ........... 714/10 |
| 2002/0152420 | A1 | * | 10/2002 | Chaudhry et al. ........... 714/11 |
| 2005/0273653 | A1 | * | 12/2005 | Zubkow ...................... 714/11 |
| 2005/0278567 | A1 | * | 12/2005 | Wolfe et al. ................. 714/11 |
| 2006/0107107 | A1 | * | 5/2006 | Michaelis et al. ........... 714/11 |

FOREIGN PATENT DOCUMENTS

JP 2000-40081 2/2000

* cited by examiner

*Primary Examiner*—Marc Duncan
(74) *Attorney, Agent, or Firm*—Oblon, Spivak, McClelland, Maier & Neustadt, P.C.

(57) ABSTRACT

A processing apparatus includes a plurality of operation units each of which performs a given operation for an input operand in accordance with an operating instruction and outputs an exception flag when a result of the operation is false, a first network which connects the storage unit which stores the operand and the operation units, a second network which connects the operation units and the storage unit, and a defect sensor which receives the exception flag from each of the operation units to sense an operation unit from which the exception flag is generated with high frequency. The apparatus further includes a logic unit controller which controls the first network and the second network to disconnect the operation unit from a system, and causes another operation unit to perform an operation assigned to the disconnected operation unit again.

11 Claims, 8 Drawing Sheets

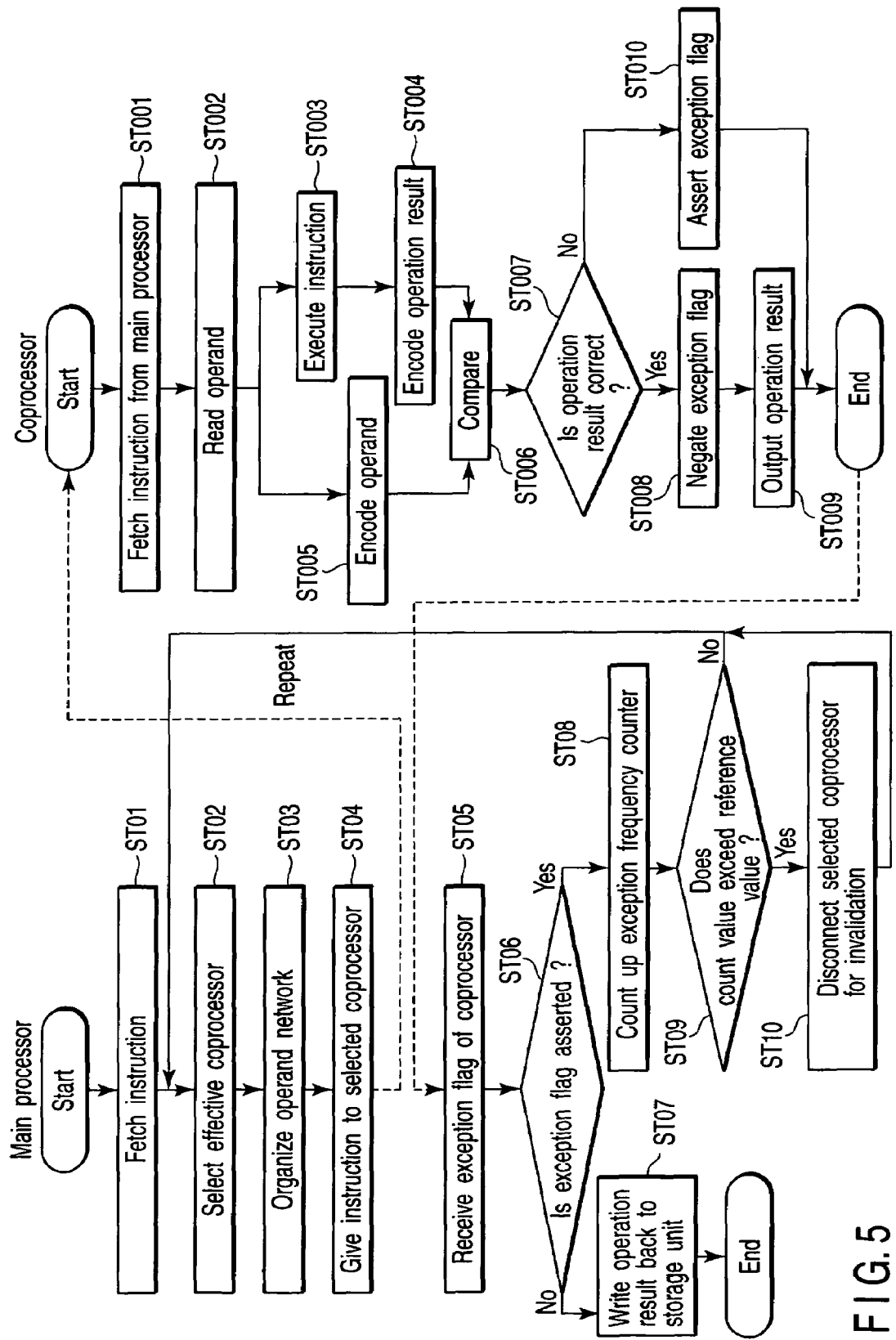
F I G. 5

PROCESSING APPARATUS

CROSS-REFERENCE TO RELATED APPLICATIONS

This application is based upon and claims the benefit of priority from prior Japanese Patent Application No. 2005-044258, filed Feb. 21, 2005, the entire contents of which are incorporated herein by reference.

BACKGROUND OF THE INVENTION

1. Field of the Invention

The present invention relates to a processing apparatus. More specifically, the invention relates to a fault tolerant system such as a logic operation unit that performs a series of operations using all or some of operation units mounted thereon.

2. Description of the Related Art

Recently, there have been not a few logic operation units, such as computers for controlling infrastructure, which operate on a 24-hour basis. These units are required at the minimum to process data without errors during operation. Under the circumstances, the fault tolerant technology is becoming more important than conventional.

The fault tolerant technology has conventionally been introduced chiefly into a storage system such as a memory. More specifically, the technology has been applied to a parity check system and an error correction circuit (ECC). At present, it is essential to introduce the tolerant technology into the storage system because the number of elements in the storage system is much larger than that in a logic circuit such as a control circuit and an operation unit and the availability of the storage system is higher than that of the control circuit.

In contrast, the introduction of the tolerant technology into the logic circuit has not been considered so significant because the number of elements is smaller, the availability is lower, and the mounting costs are higher than those in the storage system.

Paying attention to the process technology, the logic circuit decreases in size further to meet demands for higher packed density and higher operation speed. However, the logic circuits vary widely in their manufacturing process and thus difficult to manufacture with a robust circuit that secures such a large margin as conventional. In particular, the recent problem is a soft error due to minute particles. The probability of occurrence of the soft error increases, which cannot be ignored.

In order to make the operation speed higher than that of each of the logic circuits and increase the amount of data to be processed therein, the logic circuits are arranged in parallel. Unlike the prior art system, the recent system is implemented not by a high-speed, single processor using the leading-edge process and manufacturing technology, but by coupling inexpensive microprocessors, which are decreased in costs by miniaturization, in parallel or massively parallel. This system increases in the amount of hardware of the logic circuits and the possibility of a breakdown.

As described above, it becomes more important to secure the reliability of logic circuits that were not conventionally be considered so significant. A system capable of securing the reliability of an operation unit has already been known (see, for example, Jpn. Pat. Appln. KOKAI Publication No. 2000-040081).

However, as a demand for the reliability of logic circuits is growing, it becomes important to configure a system capable of not only reducing the amount of hardware but also lowering its costs and maintaining its security without degrading any functions.

BRIEF SUMMARY OF THE INVENTION

According to a first aspect of the present invention, there is provided a processing apparatus comprising a plurality of operation units having a same operating function, each of which performs a given operation for an input operand in accordance with an operating instruction and outputs an exception flag when a result of the operation is false, a storage unit which stores the operand, a first network which connects the storage unit and the operation units and supplies the operand to the operation units, a second network which connects the operation units and the storage unit to write the result of the operation of each of the operation units back to the storage unit, a defect sensor which receives the exception flag from each of the operation units to sense an operation unit from which the exception flag is generated with high frequency, and a logic unit controller which controls the first network and the second network to disconnect the operation unit sensed by the defect sensor from a system, and causes another operation unit to perform an operation assigned to the disconnected operation unit again.

According to a second aspect of the present invention, there is provided a processing apparatus comprising a plurality of operation units having a same operating function, each of which performs a given operation for an input operand in accordance with an operating instruction and outputs an exception flag when a result of the operation is false, a storage unit which stores the operand, a first network which connects the storage unit and the operation units and supplies the operand to the operation units, a second network which connects the operation units and the storage unit to write the result of the operation of each of the operation units back to the storage unit, a defect sensor which receives the exception flag from each of the operation units to sense an operation unit from which the exception flag is generated with high frequency, and a logic unit controller which controls the first network and the second network to disconnect the operation unit sensed by the defect sensor from a system, and causes another operation unit to perform an operation assigned to the disconnected operation unit again, and the operation units are logic units each for performing a desired logical operation for one or more input operands, the logic units including a first logic operation unit which performs a first logical operation to determine an operation result thereof uniquely by one or more input operands, a second logic operation unit which performs a second logical operation to determine an operation result thereof uniquely by one or more input operands, a third logic operation unit which receives the operation result of the first logic operation unit and performs a third logical operation to determine an operation result thereof uniquely, and a fourth logic operation unit which compares the operation result of the second logic operation unit and the operation result of the third logic operation unit to determine whether the operation result of the first logic operation unit is correct or not, and which outputs the exception flag when the operation result is not correct.

BRIEF DESCRIPTION OF THE SEVERAL VIEWS OF THE DRAWING

FIG. 5 is a flowchart illustrating an operation of the system shown in FIG. 1;

DETAILED DESCRIPTION OF THE INVENTION

Embodiments of the present invention will be described below with reference to the accompanying drawings.

First Embodiment

Figure 1:
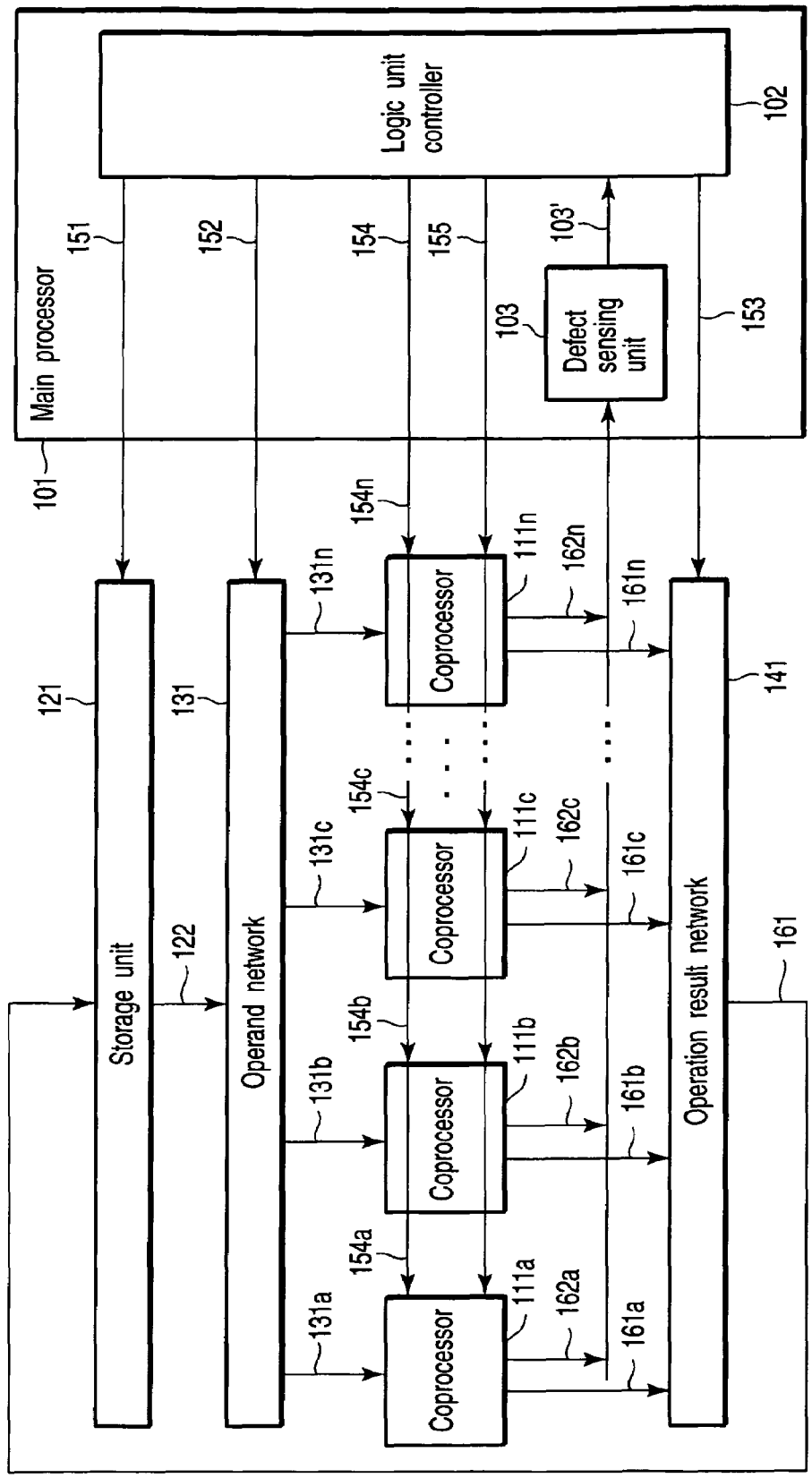
FIG. 1 is a block diagram showing a configuration of a fault tolerance system (processing apparatus) according to a first embodiment of the present invention.

FIG. 1 shows a basic configuration of a fault tolerant system (processing apparatus) according to a first embodiment of the present invention. This system will be described taking a multiprocessor, which is made up chiefly of a main processor and a plurality of coprocessors, as an example. In particular, the following case will be described. When the same process can be performed using all or some of the coprocessors, if some coprocessors are broken down, the process can be done even though they are disconnected from the multiprocessor. In this case, the process time of the multiprocessor is varied.

As shown in FIG. 1, a main processor 101 includes a logic unit controller 102 and a defect sensor 103. A plurality of coprocessors (operation units) 111a to 111n having the same operating function are connected to the defect sensor 103. The defect sensor 103 is connected to the logic unit controller 102. The coprocessors 111a to 111n, a storage unit 121, an operand network (first network) 131 and an operation result network (second network) 141 are connected to the logic unit controller 102.

The storage unit 121 stores an operand 122 that is supplied to each of the coprocessors 111a to 111n. The operand network 131 and operation result network 141 are connected to the storage unit 121. In response to a control signal 151 from the controller 102, the operand 122 is read out of the storage unit 121 and an operation result 161 is written back thereto.

The operand network 131 selects a connection of each of the coprocessors 111a to 111n to the storage unit 121 in response to a control signal 152 from the logic unit controller 102. For example, it is configured by a matrix switch (described later).

The operation result network 141 selects a connection of each of the coprocessors 111a to 111n to the storage unit 121 in response to a control signal 153 from the logic unit controller 102. For example, it is configured by a matrix switch (described later).

The coprocessors 111a to 111n receive the operand 122 as inputs 131a to 131n from the storage unit 121 through the operand network 131. Then, the coprocessors 111a to 111n selectively perform given operations in accordance with an operating instruction 155 from the logic unit controller 102 to obtain operation results 161a to 161n. The coprocessors 111a to 111n output the operation results 161a to 161n to the operation result network 141. The coprocessors 111a to 111n are controlled by a control signal 154 (154a to 154n) from the controller 102.

The coprocessors 111a to 111n have a function of outputting exception flags 162a to 162n to the defect sensor 103 when the operation results 161a to 161n are false. The coprocessors 111a to 111n perform given operations in accordance with the operating instruction 155 to encode the operation results 161a to 161n (e.g., modular operation). In parallel with this operation, the coprocessors 111a to 111n encode the operand 122. The coprocessors 111a to 111n compare the code obtained from the operand 122 and that obtained from each of the operation results 161a to 161n. The coprocessors 111a to 111n determine whether the operation results 161a to 161n are false in accordance with whether both the codes coincide with each other (correlation). Though not shown in FIG. 1, the coprocessors 111a to 111n notify the logic unit controller 102 of the validity of the operation results 161a to 161n when they determine that the operation results 161a to 161n are not false since both the codes coincide with each other. When the coprocessors 111a to 111n determine that the operation results are false since both the codes do not coincide with each other, they notify the controller 102 of it.

The defect sensor 103 counts the number of times the exception flags 162a to 162n are generated from the coprocessors 111a to 111n, for their respective coprocessors 111a to 111n to sense a coprocessor from which its corresponding exception flag is generated with high frequency, or a coprocessor that is defective due to a breakdown. This sensing operation will be described in detail later.

The logic unit controller 102 controls the storage unit 121, operand network 131, coprocessors 111a to 111n and operation result network 141 based on the sensing result (identification information of the coprocessors) 103' to cause the coprocessors 111a to 111n to perform their respective operations appropriately.

Figure 2:
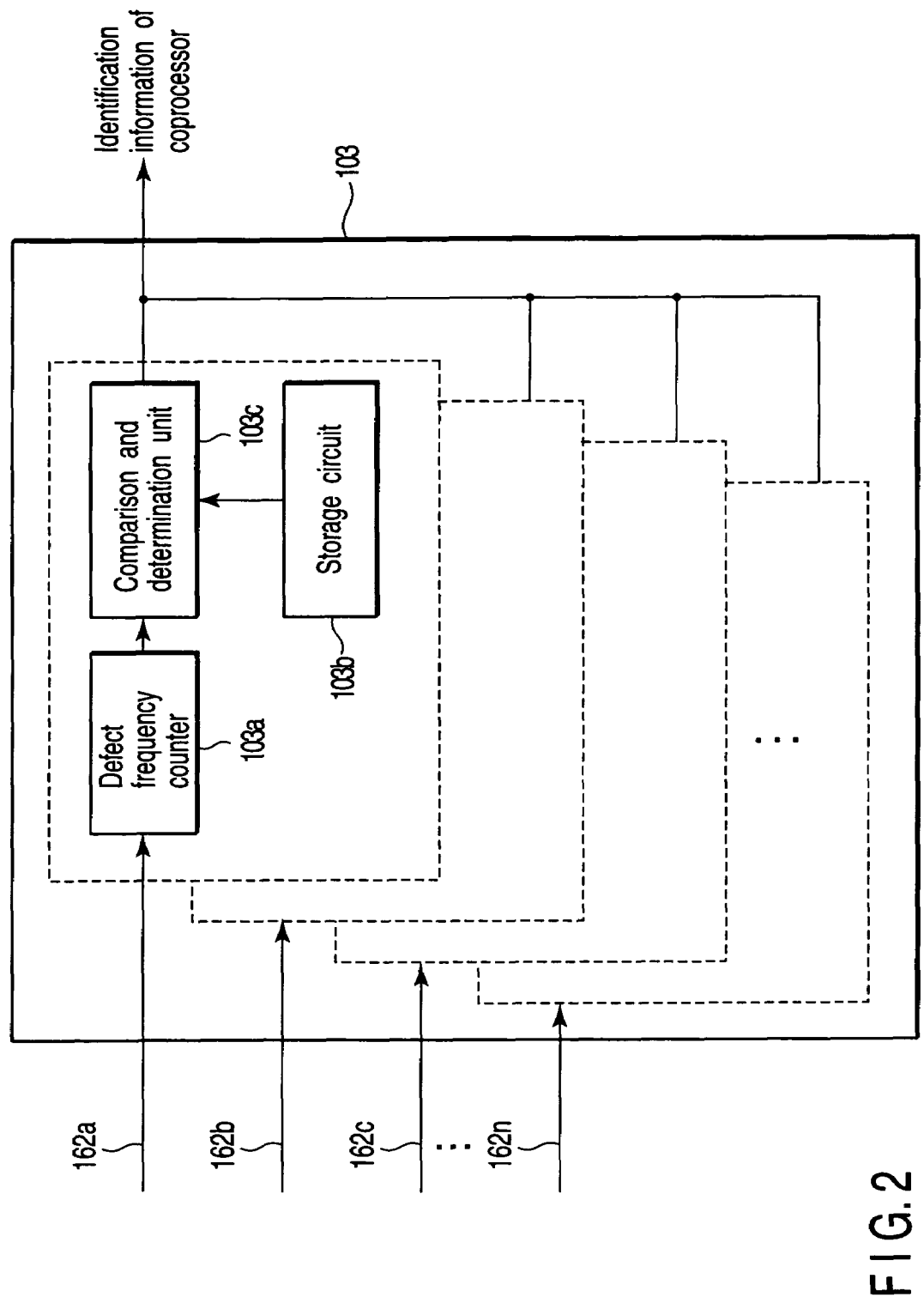
FIG. 2 is a block diagram showing a configuration of a defect sensor of the system shown in FIG. 1.

FIG. 2 specifically shows the configuration of the defect sensor 103 described above. Here a description will be given chiefly of the circuit arrangement for generating identification information of a coprocessor that is defective due to a breakdown.

The defect sensor 103 senses the exception flags 162a to 162n output from the coprocessors 111a to 111n and includes defect (exception) frequency counters 103a, storage circuits 103b and comparison and determination units 103c. The defect frequency counters 103a count the number of times the exception flags 162a to 162n are generated from their respective coprocessors 111a to 111n. The storage circuits 103b store defect determination reference values for determining defective coprocessors. The comparison and determination units 103c compare count values of the counters 103a and the defect determination reference values and output identification information (sensing result 103') of defective coprocessors in accordance with results of the comparison.

When an exception flag is asserted, the count value of the counter 103a corresponding to the coprocessor from which the exception flag is generated is incremented. If the count value exceeds the number of times (the defect determination reference value of the storage circuit 103b) given in advance, the coprocessor is determined as a defective one. Then, the comparison and determination unit 103c outputs identification information of the defective coprocessor to the logic unit controller 102.

The defect sensor 103 is so configured that it supplies the logic unit controller 102 with special identification information for giving an instruction to perform an operation again to an effective (defect-free) coprocessor when the count value of each of the counters 103a does not exceed the defect determination reference value. Except for the counters 103a, for example, the storage circuits 103b each can be shared among the coprocessors 111a to 111n. If the storage circuits 103b are provided for their respective coprocessors 111a to 111n as in the first embodiment, different determination reference values can be set to the coprocessors 111a to 111n in view of the significance of the operations.

Figure 3:
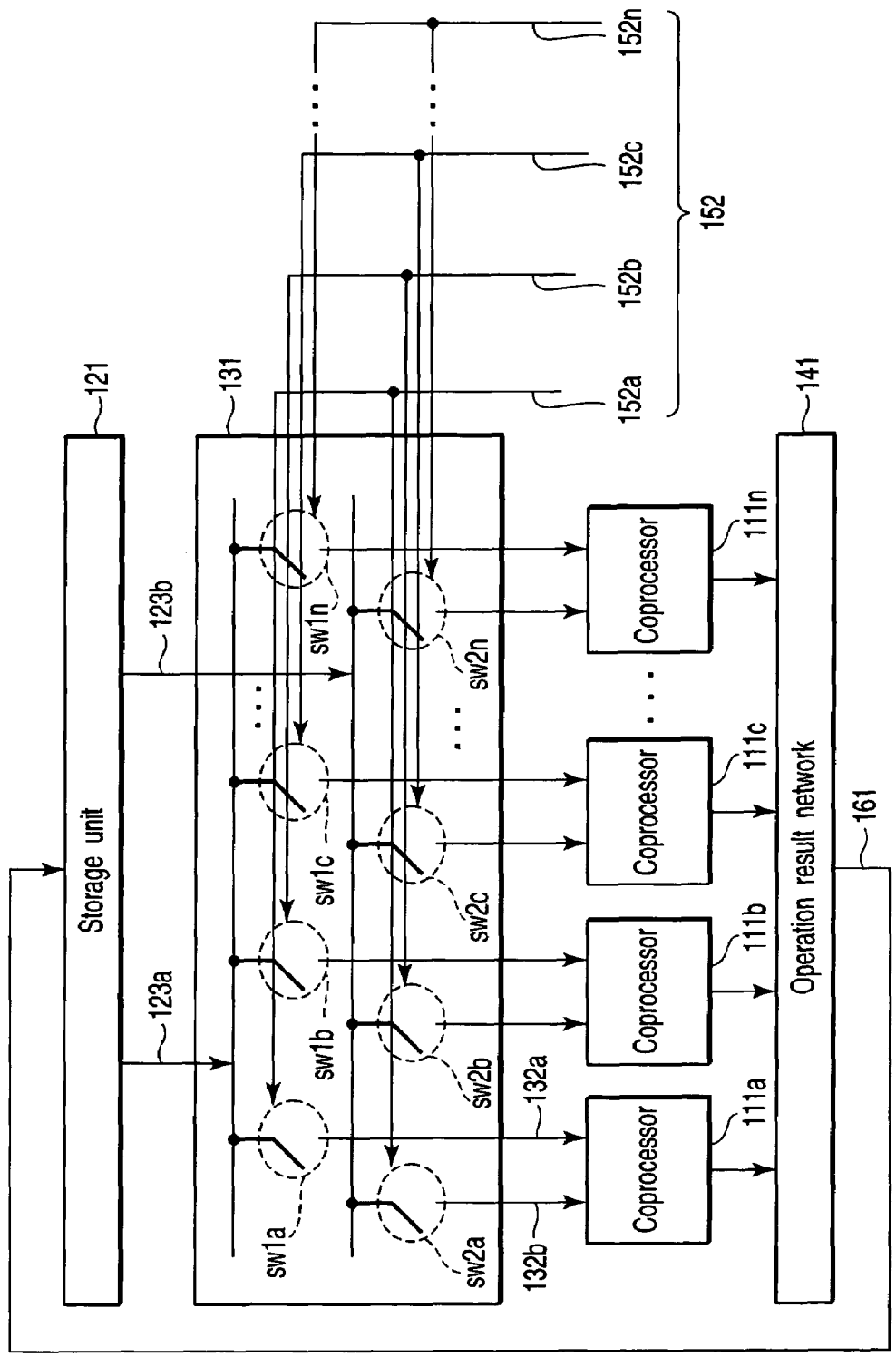
FIG. 3 is a block diagram showing a configuration of an operand network of the system shown in FIG. 1.

FIG. 3 shows a configuration of the operand network 131 described above. Here a description will be given of the case where the operand 122 is received from the storage unit 121 through two signal lines 123a and 123b and then supplied to each of the coprocessors 111a to 111n through two signal lines 132a and 132b as a corresponding one of inputs 131a to 131n.

In the case shown in FIG. 3, the operand network 131 includes switches sw1a to sw1n and switches sw2a to sw2n. The switches sw1a to sw1n are used to connect the signal line 123a to the signal lines 132a connected to the coprocessors 111a to 111n. The switches sw2a to sw2n are used to connect the signal line 123b to the signal lines 132b connected to the coprocessors 111a to 111n. Each of the switches sw1a to sw1n is turned on and off by a corresponding control signal 152 (152a to 152n) to connect the storage unit 121 and a corresponding one of the coprocessors 111a to 111n and disconnect it therefrom, as is each of the switches sw2a to sw2n.

Figure 4:
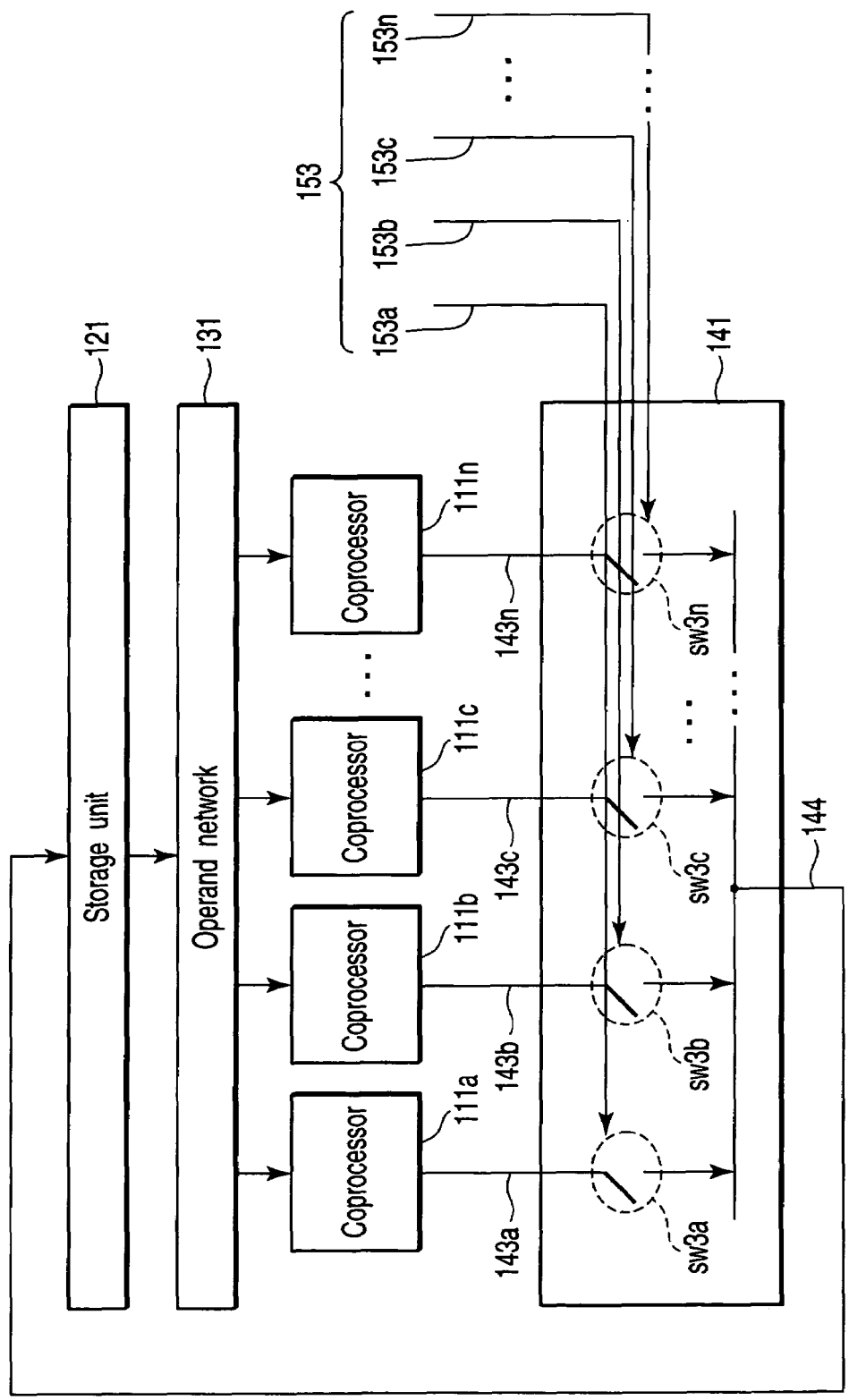
FIG. 4 is a block diagram showing a configuration of an operation result network of the system shown in FIG. 1.

FIG. 4 shows a configuration of the operation result network 141 described above. The network 141 is used to write operation results 161a to 161n of the coprocessors 111a to 111n back to the storage unit 121 as an operation result 161. The network 141 includes switches sw3a to sw3n for connecting signal lines 143a to 143n to a signal line 144. The signal lines 143a to 143n are connected to their respective coprocessors 111a to 111n, and the signal line 144 is connected to the storage unit 121. Each of the switches sw3a to sw3n is turned on and off by a corresponding control signal 153 (153a to 153n) to connect the storage unit 121 to a corresponding one of the coprocessors 111a to 111n and disconnect it therefrom.

An operation of the fault tolerant system configured as shown in FIG. 1 will be described. FIG. 5 is a flowchart illustrating an example of the operation. For brevity, assume that the respective processes are carried out time-sequentially. In the actual system, a plurality of coprocessors process instructions in parallel by the existing technology such as a time-sharing system.

The fault tolerant system according to the first embodiment processes an instruction in accordance with a series of instruction sequences. First, the main processor 101 fetches an instruction from outside and selects one from the effective coprocessors 111a to 111n, which can perform the instruction (steps ST01 and ST02). Assume here that the coprocessor 111a is selected.

The main processor 101 causes the logic unit controller 102 to supply the coprocessor 111a with the control signal 154a to select the coprocessor 111a. The main processor 101 also causes the controller 102 to supply the operand network 131 with the control signal 152 to connect the selected coprocessor 111a to the storage unit 121. Thus, the selected coprocessor 111a and storage unit 121 are connected to each other through the operand network 131 (step ST03).

The main processor 101 causes the controller 102 to supply the storage unit 121 with the control signal 151 to control the readout of the operand 122. The main processor 101 also causes the controller 102 to issue the operating instruction 155 to the selected coprocessor 111a (step ST04).

Then, the coprocessor 111a fetches the operating instruction 155 and reads the operand 122 out of the storage unit 121 through the operand network 131 (steps ST001 and ST002). In response to the operating instruction 155, the coprocessor 111a performs a given operation and encodes the operation result 161a (steps ST003 and ST004). In parallel with the operation, the coprocessor 111a encodes the operand 122 (step ST005). After that, the coprocessor 111a compares the code obtained from the operand 122 and that obtained from the operation result 161a and determines whether the operation result 161a is false or not (steps ST006 and ST007).

When the coprocessor 111a determines that the operation result 161a is not false (correct), it negates the exception flag 162a, notifies the logic unit controller 102 of the validity of the operation result 161a, and supplies the operation result 161a to the operation result network 141 (steps ST008 and ST009).

When the exception flag 162a generated from the coprocessor 111a is negated or the operation result 161a is not false (steps ST05 and ST06), the main processor 101 causes the logic unit controller 102 to supply the operation result network 141 with the control signal 153. The main processor 101 also causes the controller 102 to supply the storage unit 121 with the control signal 151 to control the write-back of the operation result 161. Thus, the selected coprocessor 111a and storage unit 121 are connected to each other to write the operation result 161 back to the storage unit 121 (step ST07).

If the operation result 161a is determined as a false one in step ST007, the coprocessor 111a asserts the exception flag 162a and outputs it to the defect sensor 103 (step ST010). The coprocessor 111a also notifies the logic unit controller 102 that the operation result 161a is false.

When the exception flag 162a generated from the coprocessor 111a is asserted or the operation result 161a is false, the main processor 101 causes the logic unit controller 102 to supply the operation result network 141 with the control signal 153 to inhibit the operation result 161a from being written back to the storage unit 121. Thus, the operation result 161a is not written back to the storage unit 121.

When the exception flag 162a generated from the selected coprocessor 111a is asserted, the defect sensor 103 that received the exception flag 162a increments the count value of the defect frequency counter 103a corresponding to the coprocessor 111a (step ST08). The comparison and determination unit 103c compares the count value with the defect determination reference value of the storage circuit 103b.

If the count value is smaller than the defect determination reference value (step ST09), the defect sensor 103 notifies the logic unit controller 102 of it (e.g., special identification information). Thus, the main processor 101 repeats the operations of steps ST02 to ST09 and executes the instruction (operation) assigned to the coprocessor 111a again using other coprocessors 111b to 111n. In other words, an effective coprocessor is selected again by the control signals 152 and 154, and the selected coprocessor is connected to the operand network 131 to perform a given operation again in response to the operating instruction 155.

If the count value is not smaller than the defect determination reference value, the defect sensor 103 notifies the logic unit controller 102 of the sensing result (identification information of coprocessor 111a) 103'. Thus, the main processor 101 determines that the coprocessor 111a decreases in reliability (increases in fraction defective) due to a breakdown or the like. The main processor 101 controls the control signals 152 and 153 output from the controller 102 and then invalidates a connection between the coprocessor 111a and each of the operand network 131 and operation result network 141 in order to disconnect the coprocessor 111a from the system (step ST10). The main processor 101 repeats the operations of step ST02 and the following steps and executes the instruction (operation) assigned to the coprocessor 111a using other coprocessors 111b to 111n.

When the coprocessor 111a is determined as a defective one, it can be prevented from being selected in the future by the control signal 154a output from the logic unit controller 102, and it can be prevented from being supplied with the operating instruction 155 from the controller 102.

The above process is not limited to the coprocessor 111a but can be applied to the other coprocessors 111b to 111n. It can also be applied to the execution of a series of instructions using all or some of the coprocessors 111a to 111n.

As described above, the fault tolerant system performs a series of operations using all or some of coprocessors included therein. When a coprocessor is determined as a defective one, it is disconnected from the system and an operation assigned to the coprocessor is performed again by another effective coprocessor. The system can thus maintain its security without degrading any functions.

Particularly when the validity of an operation result is insured by a comparison between a code obtained from the input operand and a code obtained from the operation result, or a coprocessor with high fraction defective is specified, the reliability of the coprocessor can be secured. Further, the system can reduce in the amount of hardware and costs more greatly than the conventional system.

Second Embodiment

Figure 6:
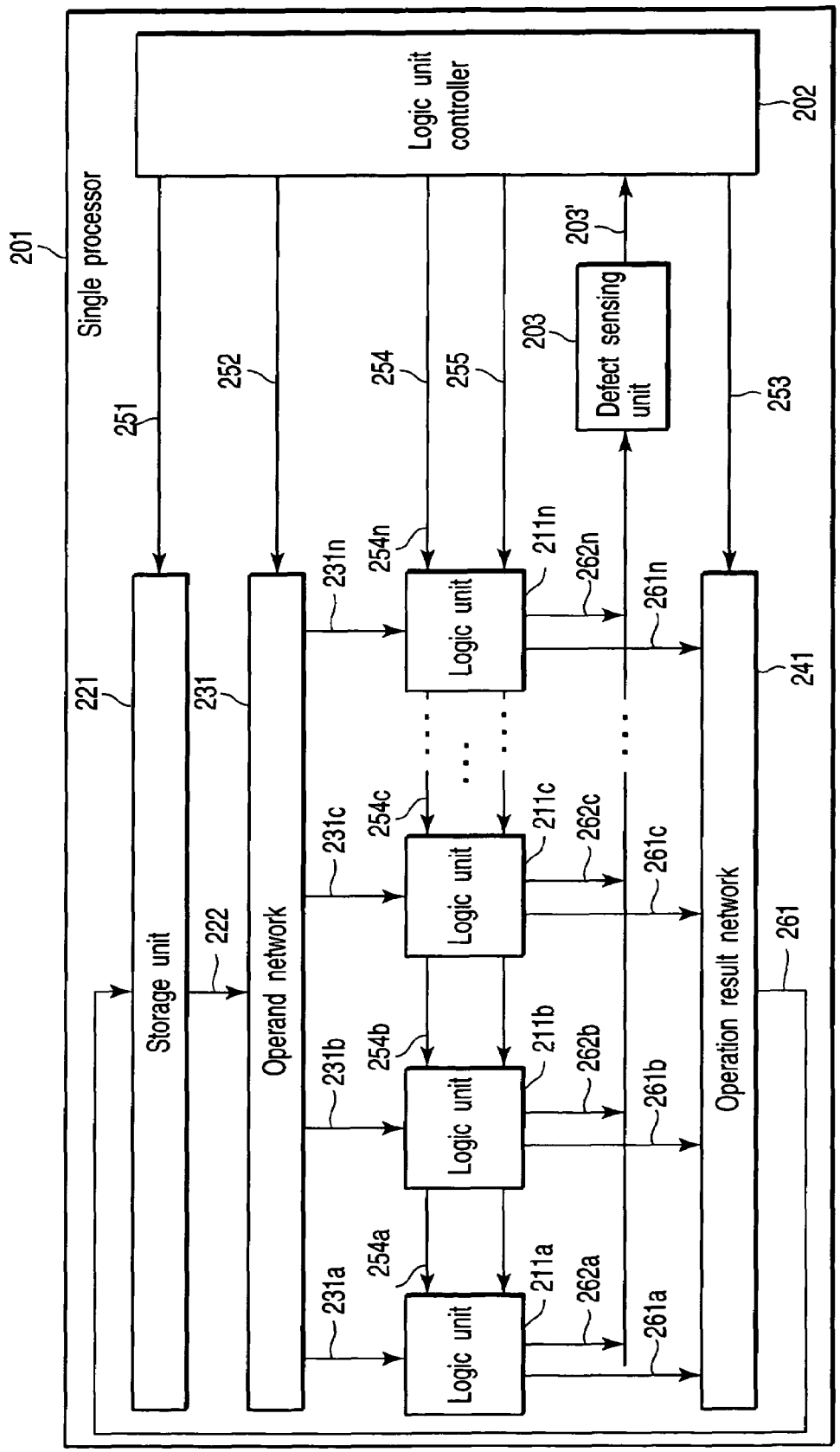
FIG. 6 is a block diagram showing a configuration of a fault tolerance system (processing apparatus) according to a second embodiment of the present invention.

FIG. 6 shows a basic configuration of a fault tolerant system (processing apparatus) according to a second embodiment of the present invention. This system will be described taking a single processor, which includes a plurality of operation units (logic units) having the same function, as an example. In particular, the following case will be described. When the same process can be performed using all or some of the operation units, if some units are broken down, the process can be done even though they are separated from the single processor. In this case, no process time varies among the operation units.

As shown in FIG. 6, a single processor 201 includes a logic unit controller 202 and a defect sensor 203. A plurality of logic units (operation units) 211a to 211n having the same operating function are connected to the defect sensor 203. The defect sensor 203 is connected to the logic unit controller 202. The logic units 211a to 211n, a storage unit 221, an operand network (first network) 231 and an operation result network (second network) 241 are connected to the logic unit controller 202.

The storage unit 221 stores an operand 222 that is supplied to each of the logic units 211a to 211n. The operand network 231 and operation result network 241 are connected to the storage unit 221. In response to a control signal 251 from the controller 202, the operand 222 is read out of the storage unit 221 and an operation result 261 is written back thereto.

The operand network 231 selects a connection of each of the logic units 211a to 211n to the storage unit 221 in response to a control signal 252 from the logic unit controller 202. For example, it is configured by the matrix switch shown in FIG. 3.

The operation result network 241 selects a connection of each of the logic units 211a to 211n to the storage unit 221 in response to a control signal 253 from the logic unit controller 202. For example, it is configured by the matrix switch shown in FIG. 4.

The logic units 211a to 211n receive the operand 222 as inputs 231a to 231n from the storage unit 221 through the operand network 231. Then, the logic units 211a to 211n selectively perform given operations in accordance with an operating instruction 255 from the logic unit controller 202 to obtain operation results 261a to 261n. The logic units 211a to 211n output the operation results 261a to 261n to the operation result network 241. The logic units 211a to 211n are controlled by a control signal 254 (254a to 254n) from the controller 202.

The logic units 211a to 211n have a function of outputting exception flags 262a to 262n to the defect sensor 203 when the operation results 261a to 261n are false. The logic units 211a to 211n perform given operations in response to an operating instruction 255 to encode the operation results 261a to 261n (e.g., modular operation). In parallel with this operation, the logic units 211a to 211n encode the operand 222. The logic units 211a to 211n compare the code obtained from the operand 222 and that obtained from each of the operation results 261a to 261n. The logic units 211a to 211n determine whether the operation results 261a to 261n are false in accordance with whether both the codes coincide with each other (correlation). Though not shown in FIG. 6, the logic units 211a to 211n notify the logic unit controller 202 of the validity of the operation results 261a to 261n when they determine that the operation results 261a to 261n are not false since both the codes coincide with each other. When the logic units 211a to 211n determine that the operation results 261a to 261n are false since both the codes do not coincide with each other, they notify the controller 202 of it.

The defect sensor 203 counts the number of times the exception flags 262a to 262n are generated from the logic units 211a to 211n, for their respective logic units 211a to 211n to sense a logic unit from which its corresponding exception flag is generated with high frequency, or a logic unit that is defective due to a breakdown (see, for example, FIG. 2).

The logic unit controller 202 controls the storage unit 221, operand network 231, logic units 211a to 211n and operation result network 241 based on the sensing result (identification information of the logic units) 203' to cause the logic units 211a to 211n to perform their respective operations appropriately.

The configuration of the above logic units 211a to 211n will be described more specifically.

Figure 7:
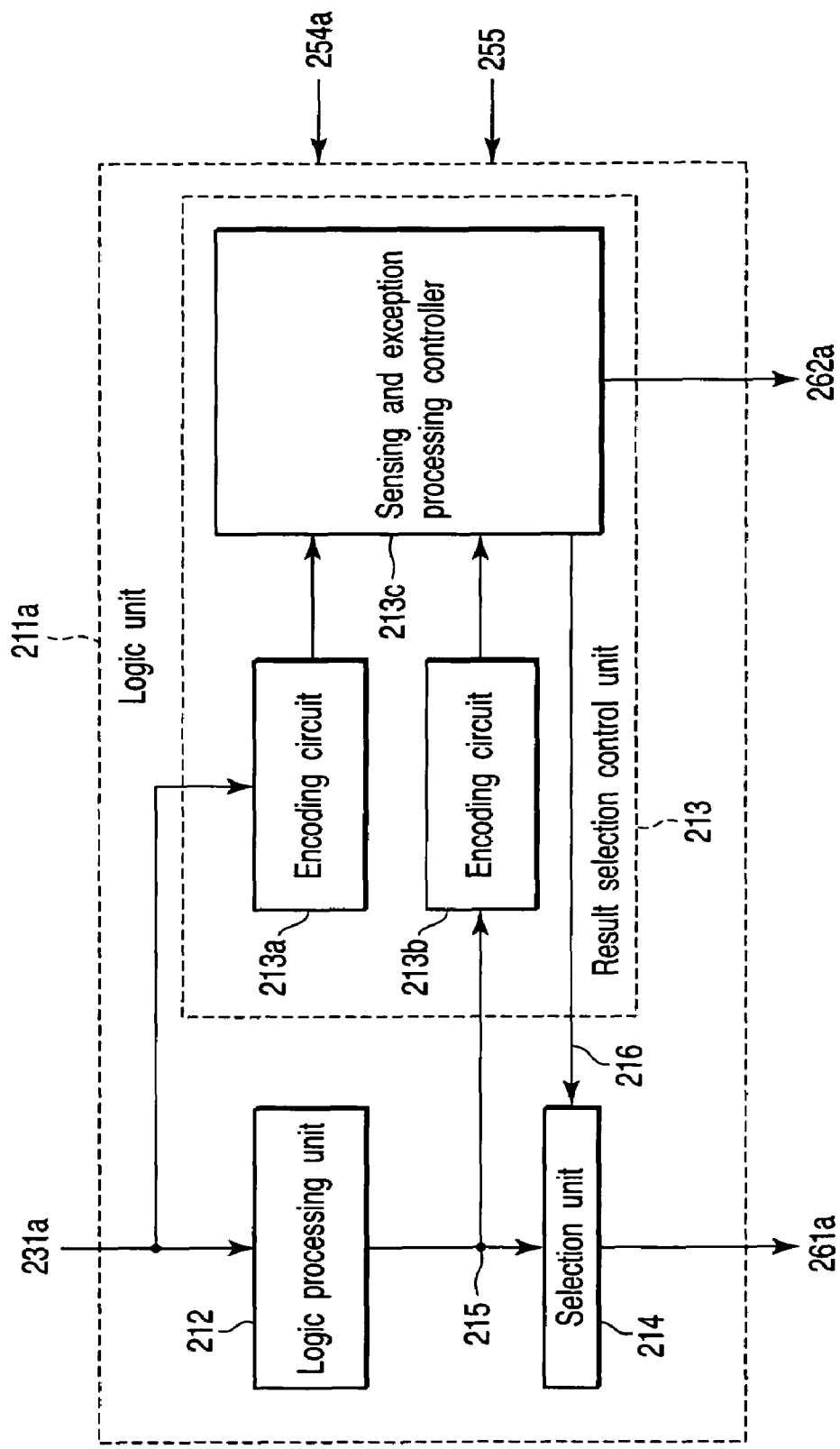
FIG. 7 is a block diagram showing a basic configuration of a logic unit of the system shown in FIG. 6.

FIG. 7 shows a basic configuration of the logic unit 211a as one example. The logic unit 211a includes a logic operation unit (first logic operation unit) 212, a result selection control unit 213 and a selection unit 214. The logic operation unit 212 receives an input 231a (corresponding to the operand 222) through the operand network 231 and performs a given operation in response to the operating instruction 255 from the logic unit controller 202, thereby obtaining an intermediate operation result 215 as the operation result 261a.

The result selection control unit 213 includes first and second encoding circuits (second and third logic operation units) 213a and 213b and a sensing and exception processing controller (fourth logic operation unit) 213c. The first encoding circuit 213a encodes the operand 222 based on the input 231a. The second encoding circuit 213b encodes the operation result 261a based on the intermediate operation result 215. The sensing and exception processing controller 213c compares the outputs (codes) of the circuits 213a and 213b and generates an exception flag 262a and a selection control signal 216 in accordance with a result of the comparison. When a code obtained from the operand 222 and that obtained from the operation result 261a do not coincide with each other, the exception flag 262a is asserted and a selection control signal 216 for inhibiting the operation result 261a from being output is generated. When these codes coincide with each other, the exception flag 262a is negated and a selection control signal 216 for allowing the operation result 261a to be output.

The selection unit 214 receives the selection control signal 216 from the sensing and exception processing controller 213c and determines whether to output the intermediate operation result 215 as the operation result 261a of the logic unit 211a.

Figure 8:
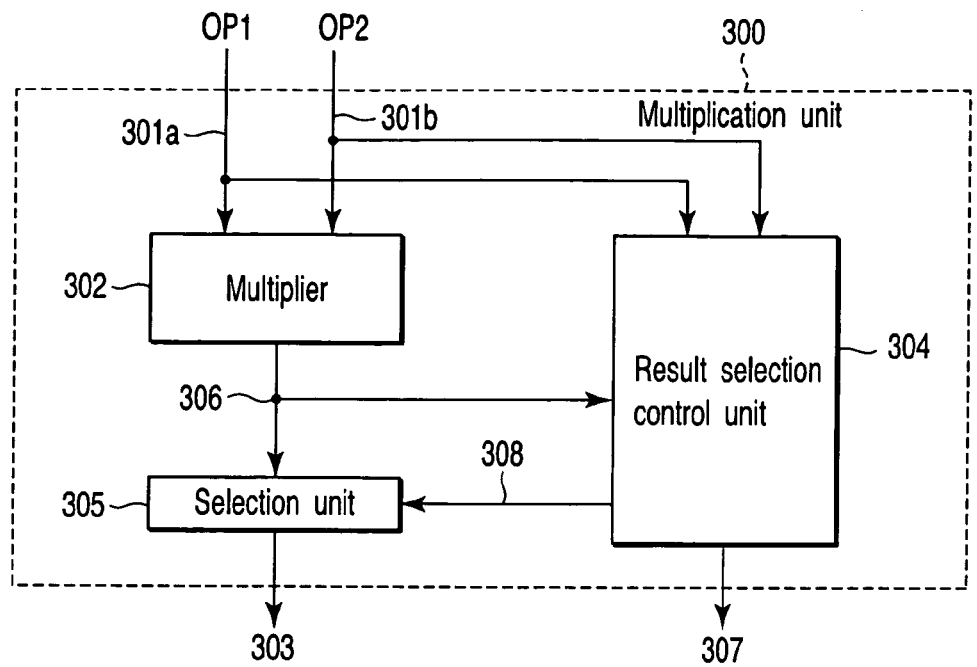
FIG. 8 is a block diagram showing a specific example (multiplication unit) of the logic unit shown in FIG. 7.

FIG. 8 shows a specific (application) example of the logic units 211a to 211n described above. In FIG. 8, the logic unit is configured as a multiplication unit 300.

The multiplication unit 300 includes a multiplier 302, a result selection control unit 304 and a selection unit 305. Upon receiving operands OP1 and OP2 through signal lines 301a and 301b, the multiplier 302 performs a given multiplying operation to obtain an operation result 303 as a multiplication result.

The multiplier 302 is, for example, an integer multiplier. The multiplier 302 acquires an intermediate operation result (OP1×OP2) 306 based on the operands OP1 and OP2 received through the signal lines 301a and 301b. Though the multiplier can be configured by different types of hardware, the configuration of the multiplier does not affect the multiplication unit 300 and thus its detailed description is omitted. For example, the multiplier 302 obtains a multiplication result by obtaining a partial product using the secondary Booth algorithm, then performing a carry saving and adding operation without ripple carry using a Wallace tree, and finally adding a sum component and a carry component using an adder circuit with carry ripple.

Figure 9:
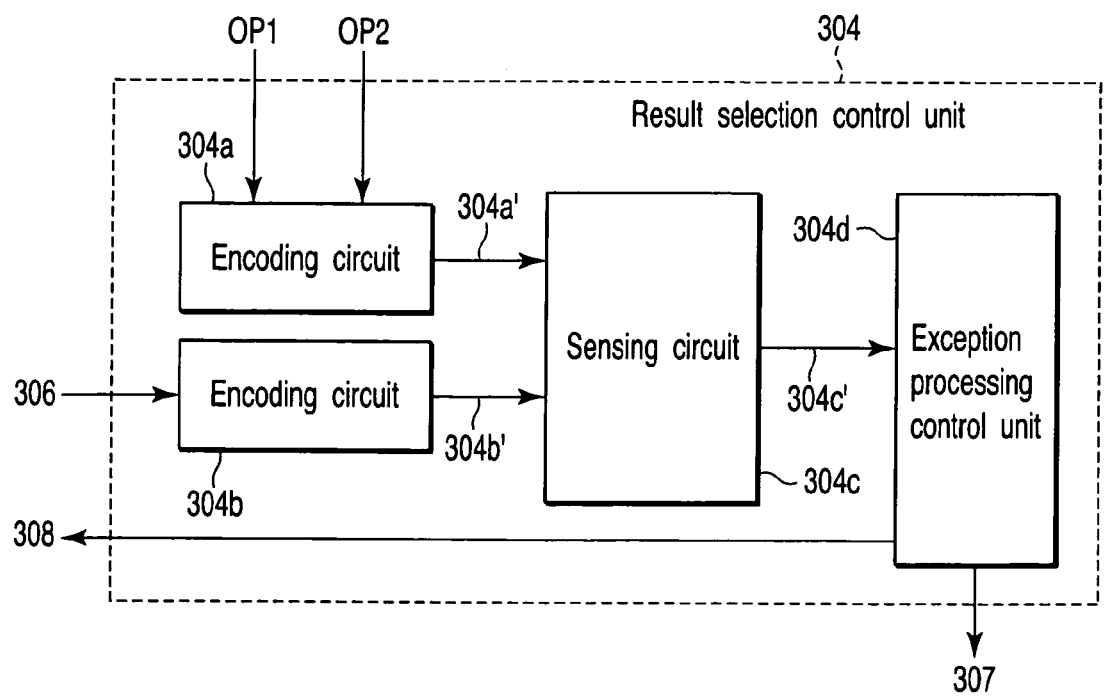
FIG. 9 is a block diagram detailing the multiplication unit shown in FIG. 8.

The result selection control unit 304 determines whether the intermediate operation result 306 of the multiplier 302 is false or not. The unit 304 supplies a result of the determination to the outside as an exception flag 307 and also supplies it to the selection unit 305 as a selection control signal 308 to control the unit 305. As shown in FIG. 9, the unit 304 includes encoding circuits 304a and 304b, a sensing circuit 304c and an exception processing control unit 304d. The encoding circuit 304a encodes the operands OP1 and OP2 input to the multiplier 302 to obtain a result uniquely, and outputs an encoded signal 304a'. The encoding circuit 304b encodes the intermediate operation result 306 of the multiplier 302 to obtain a result uniquely, and outputs an encoded signal 304b'. The sensing circuit 304c senses whether the encoded signals 304a' and 304b' coincide with each other and outputs a result of the sensing as a sensing signal 304c'. When the signals 304a' and 304b' do not coincide with each other, the exception processing control unit 304d determines that the intermediate operation result 306 is false due to some factors. The unit 304d supplies the status to the outside through the exception flag 307 and also supplies the selection control signal 308 to the selection unit 305 to control the output of the operation result 303.

The selection unit 305 determines whether to output the intermediate operation result 306 in response to the selection control signal 308 from the unit 304d. If the sensing circuit 304c senses that the encodes signals 304a' and 304b' coincide with each other and the operation result of the multiplier 302 is not false, the intermediate operation result 306 is output as a operation result 303. If, conversely, the sensing circuit 304c determines that the signals 304a' and 304b' do not coincide and the operation result is false, the constant of a given format indicating an exception is output as an operation result 303.

An operation of the foregoing multiplication unit 300 will be described. The multiplication unit 300 receives operands OP1 and OP2 as inputs. The multiplier 302 receives operands OP1 and OP2 and performs a given multiplying operation to obtain the intermediate operation result (OP1×OP2) 306.

In contrast, the encoding circuit 304a encodes the operands OP1 and OP2. Consider a remainder operation (modular operation) "MOD3" using modulus "3" which is performed as an encoding operation of the encoding circuit 304a in the second embodiment. "MOD3" is an operating instruction to obtain a remainder when a certain number is divided by three. The division is defined within the range of an integer.

The encoding circuit 304a encodes the operands OP1 and OP2 to obtain the following:

MOD3(OP1)

MOD3(OP2)

$$\text{MOD3}(\text{MOD3}(OP1) \times \text{MOD3}(OP2)) \tag{1}$$

The encoding circuit 304b encodes the intermediate operation result 306 of the multiplier 302 to obtain the following:

$$\text{MOD3}(\text{intermediate operation result 306}) \tag{2}$$

The following equation is obtained for two integers a and b as a mathematical feature:

$$\text{MOD3}(a \times b) = \text{MOD3}(\text{MOD3}(a) \times \text{MOD3}(b)) \tag{3}$$

If the integers a and b are expressed as m|(a−b) where m is a natural number, they are congruent numbers with natural number m as a modulus and expressed as follows:

$$a \equiv b \pmod{m}$$

The congruence sign (≡) has the same nature as that of the equal sign (=). That is:

$$a \equiv a \pmod{m}$$

If $a \equiv b \pmod{m}$, $b \equiv a \pmod{m}$.

If $a \equiv b \pmod{m}$ and $b \equiv c \pmod{m}$, $a \equiv c \pmod{m}$.

Furthermore, the following theorem is established:

If $a \equiv b \pmod{m}$ and $c \equiv d \pmod{m}$, $a+c \equiv b+d \pmod{m}$, $a-c \equiv b-d \pmod{m}$, and $a \times c \equiv b \times d \pmod{m}$.

The sensing circuit 304c compares the encoded signals 304a' and 304b'. In other words, it compares the above operation results (1) and (2). If (1) is equal to (2), both (1) and (2) are correct. Only in this case, the sensing circuit 304c determines that the intermediate operation result 306 is not false.

If (1) is not equal to (2), the following three cases are assumed:

(a). The operation result (1) is false due to some factors;

(b). The operation result (2) is false due to some factors; and (c). Both the operation results (1) and (2) are false due to some factors.

In the case (b), the sensing circuit 304c erroneously determines that the operation result is false though the intermediate operation result 306 is actually correct. However, the following relationship is given:

The amount of hardware in the multiplier 302>>the amount of hardware in the result selection control unit 304.

If, therefore, (1) is not equal to (2), the following relationship is given in probability among the above cases (a), (b) and (c):

Probability of case (a)>>Probability of each of cases (b) and (c) (4)

From the standpoint of the fault tolerant system, it is not approved that "false" is determined as "correct" but it is permitted that "correct" is redundantly determined as "false". In the second embodiment of the present invention, too, there is a case where "correct" is redundantly determined as "false" based on the above relationship (4), which is within the bounds of what is permissible.

When (1) is equal to (2), the exception processing control unit 304d supplies the selection unit 305 with the selection control signal 308 in response to the sensing signal 304c' output from the sensing circuit 304c in order to output the intermediate operation result 306 as a operation result 303. When (1) is not equal to (2), the unit 304d supplies the status to the outside through the exception flag 307 and also supplies the selection unit 305 with the selection control signal 308 in order to control the output of the operation result 303.

As in the first embodiment, a logic unit (multiplication unit) whose defect is sensed can be disconnected from the system, and an operation assigned to the logic unit can be performed again by another effective logic unit. Consequently, the system can maintain its security without degrading any functions.

In particular, the logic units can be configured by a small amount of hardware and thus the system can be decreased in costs and increased in reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processing apparatus comprising:
   a plurality of operation units having a same operating function, each of which performs a given operation for an input operand in accordance with an operating instruction and outputs an exception flag when a result of the operation is false;
   a storage unit which stores the operand;
   a first network which connects the storage unit and the operation units and supplies the operand to the operation units;
   a second network which connects the operation units and the storage unit to write the result of the operation of each of the operation units back to the storage unit;
   a defect sensor which receives the exception flag from each of the operation units to sense an operation unit from which the exception flag is generated with high frequency, wherein the defect sensor includes
      a counter circuit provided for at least each of the operation units, which counts the number of times the exception flag is generated;
      a storage circuit which stores a determination reference value; and
      a comparison circuit which compares a count value of the counter circuit and the determination reference value; and
   a logic unit controller which controls the first network and the second network to disconnect the operation unit sensed by the defect sensor from a system, and causes another operation unit to perform an operation assigned to the disconnected operation unit again.

2. The processing apparatus according to claim 1, which is a multiprocessor including a main processor that is made up of the defect sensor and the logic unit controller and a plurality of coprocessors corresponding to the operation units.

3. The processing apparatus according to claim 1, which is a single processor including a plurality of equivalent logic units corresponding to the operation units.

4. The processing apparatus according to claim 3, wherein the equivalent logic units includes:
   a first logic operation unit which performs a first logical operation to determine an operation result thereof uniquely by one or more input operands;
   a second logic operation unit which performs a second logical operation to determine an operation result thereof uniquely by one or more input operands;
   a third logic operation unit which receives the operation result of the first logic operation unit and performs a third logical operation to determine an operation result thereof uniquely; and
   a fourth logic operation unit which compares the operation result of the second logic operation unit and the operation result of the third logic operation unit to determine whether the operation result of the first logic operation unit is correct or not, and which outputs the exception flag when the operation result is not correct.

5. The processing apparatus according to claim 1, wherein the first network is configured by a matrix switch.

6. The processing apparatus according to claim 1, wherein the second network is configured by a matrix switch.

7. A processing apparatus comprising:
   a plurality of operation units having a same operating function, each of which performs a given operation for an input operand in accordance with an operating instruction and outputs an exception flag when a result of the operation is false;
   a storage unit which stores the operand;
   a first network which connects the storage unit and the operation units and supplies the operand to the operation units;
   a second network which connects the operation units and the storage unit to write the result of the operation of each of the operation units back to the storage unit;
   a defect sensor which receives the exception flag from each of the operation units to sense an operation unit from which the exception flag is generated with high frequency; and
   a logic unit controller which controls the first network and the second network to disconnect the operation unit sensed by the defect sensor from a system, and causes another operation unit to perform an operation assigned to the disconnected operation unit again,
   wherein the operation units are logic units each of which performs a desired logical operation for one or more input operands, the logic units including:
   a first logic operation unit which performs a first logical operation to determine an operation result thereof uniquely by one or more input operands;
   a second logic operation unit which performs a second logical operation to determine an operation result thereof uniquely by one or more input operands;
   a third logic operation unit which receives the operation result of the first logic operation unit and performs a third logical operation to determine an operation result thereof uniquely; and
   a fourth logic operation unit which compares the operation result of the second logic operation unit and the operation result of the third logic operation unit to determine whether the operation result of the first logic operation unit is correct or not, and which outputs the exception flag when the operation result is not correct.

8. The processing apparatus according to claim 7, wherein the second logic operation unit performs a modular operation to encode the one or more input operands, the third logic operation unit performs a modular operation to encode an operation result of the first logic operation unit, and there is a correlation between an operation result of the second logic operation unit and an operation result of the third logic operation unit.

9. The processing apparatus according to claim 7, wherein the defect sensor includes:

a counter circuit provided for at least each of the operation units, which counts the number of times the exception flag is generated;

a storage circuit which stores a determination reference value; and a comparison circuit which compares a count value of the counter circuit and the determination reference value.

10. The processing apparatus according to claim 7, wherein the first network is configured by a matrix switch.

11. The processing apparatus according to claim 7, wherein the second network is configured by a matrix switch.

\* \* \* \* \*